US006346314B1

United States Patent
Chaumel et al.

(10) Patent No.: US 6,346,314 B1
(45) Date of Patent: Feb. 12, 2002

(54) DEVICE FOR LOCATING A RUPTURE IN A TRANSPARENT PANEL WITH AT LEAST TWO PANES AND PANEL THUS OBTAINED

(75) Inventors: Pascal Chaumel, Plaisance du Touch; Alain Depeige, Tournefeuille, both of (FR)

(73) Assignee: Aerospatiale, Paris Cedex (FR)

( * ) Notice: Subject to any disclaimer, the term of this patent is extended or adjusted under 35 U.S.C. 154(b) by 0 days.

(21) Appl. No.: 09/393,018

(22) Filed: Sep. 9, 1999

(30) Foreign Application Priority Data

Sep. 9, 1998 (FR) .............................. 98 11388

(51) Int. Cl.[7] .............................. B32B 27/14; B32B 3/00
(52) U.S. Cl. ..................... 428/195; 428/203; 428/204; 428/913.3
(58) Field of Search .................... 428/192, 193, 428/195, 203, 204, 913.3

(56) References Cited

FOREIGN PATENT DOCUMENTS

| EP | 0 542 537 | 1/1993 |
|----|-----------|--------|
| GB | 2 169 239 | 7/1986 |
| GB | 2 260 420 | 4/1993 |
| WO | WO 97/31357 | 8/1997 |

*Primary Examiner*—Bruce H. Hess
*Assistant Examiner*—B. Shewareged
(74) *Attorney, Agent, or Firm*—Young & Thompson

(57) ABSTRACT

The object of the invention is a device for locating a rupture represented by at least one break line (22, 24, 36, 38, 40) in a transparent panel (10) comprising at least two panes (12, 14; 26, 28, 30), particularly of the windshield of the cockpit of an aircraft, characterized in that it comprises an opaque or semi-opaque obstacle (20, 32, 34) disposed between two adjacent panes.

The invention also covers a panel equipped with such a device.

11 Claims, 2 Drawing Sheets

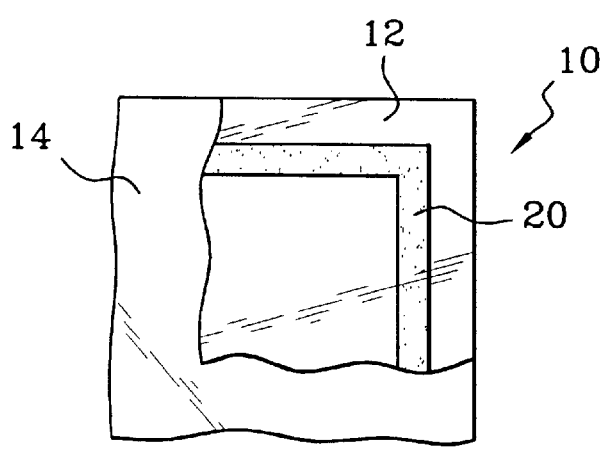
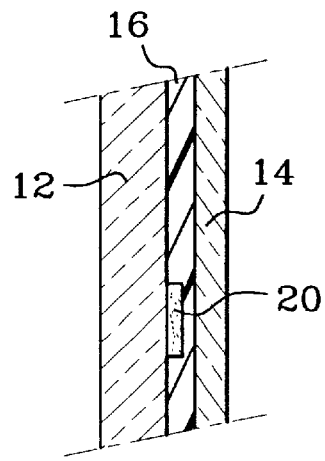
FIG.1    FIG.2
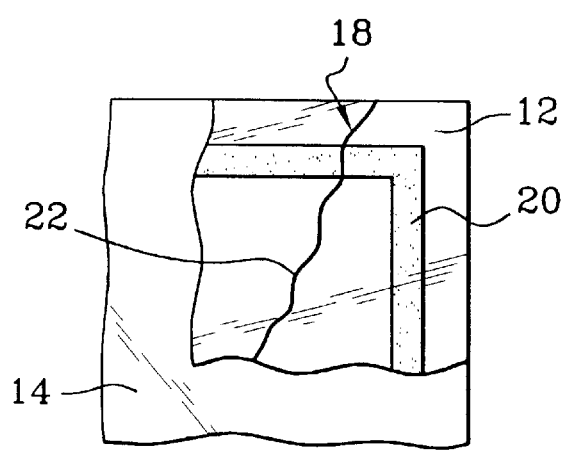
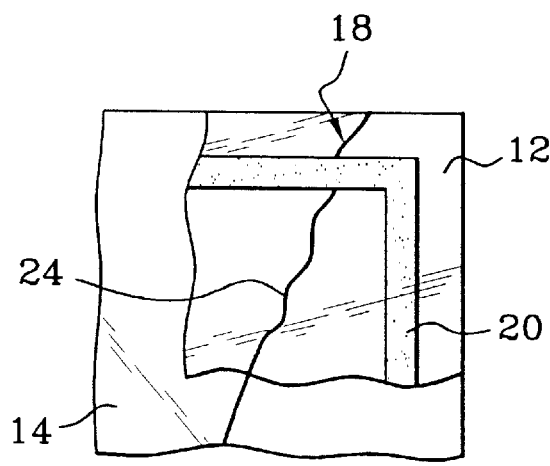
FIG.3A    FIG.3B

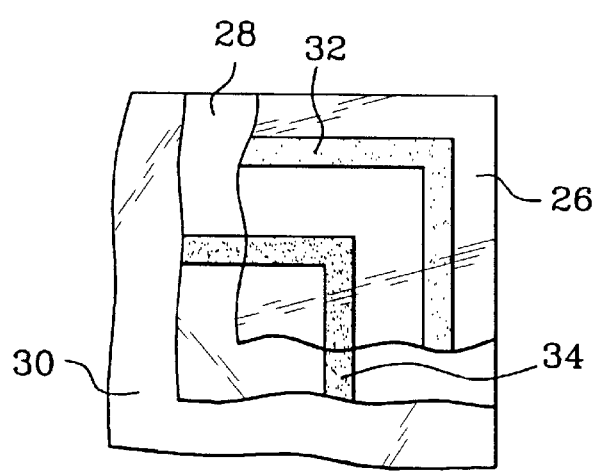
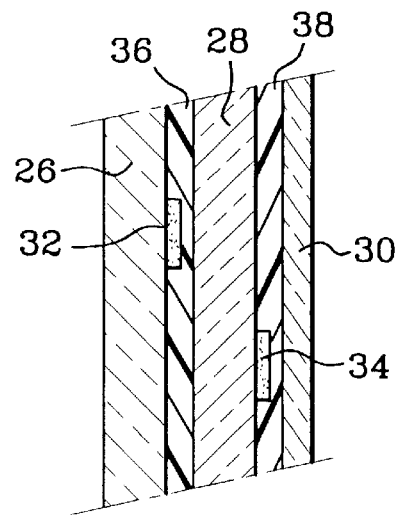
FIG.4  FIG.5
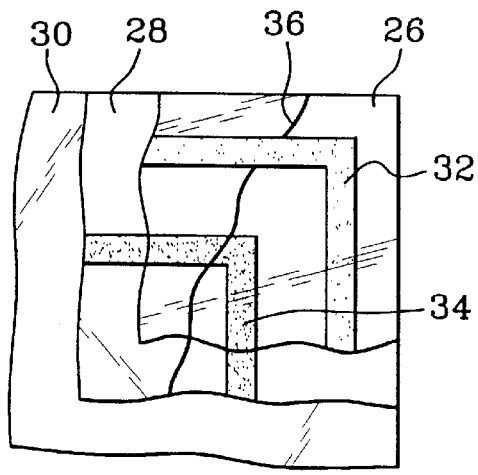
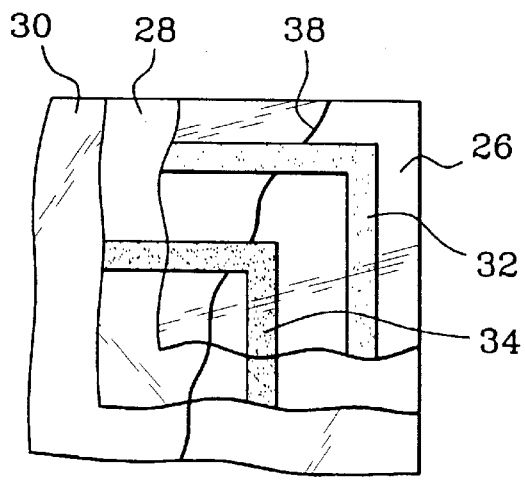
FIG.6A  FIG.6B
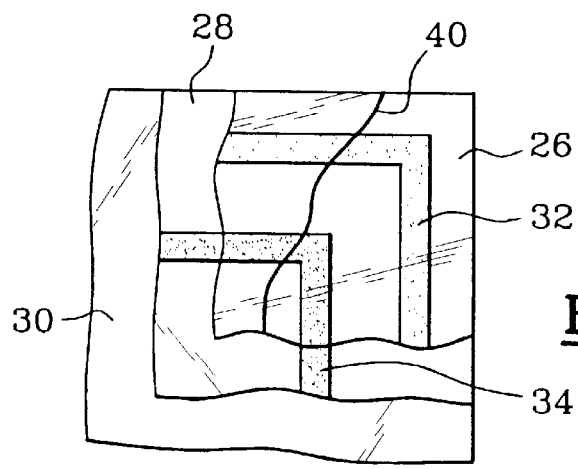
FIG.6C

DEVICE FOR LOCATING A RUPTURE IN A TRANSPARENT PANEL WITH AT LEAST TWO PANES AND PANEL THUS OBTAINED

The present invention relates to a device for locating a rupture in a transparent panel with several panes such as the windshield of the cockpit or windows of airplanes as well as the panel provided with this device.

In the field of transport, there is known the problem of impacts of various origins which can lead to deterioration of the exposed portions of the vehicle such as the windshield or the windows.

Thus, different airborne vehicles as well as terrestrial or marine, are provided with openings provided with protective panels which have as their principal characteristic being transparent.

For reasons of mechanical strength or safety, these panels are constituted by several panes of transparent material:

of mineral origin such as glass, quartz, silica or combinations of these, or of organic origin such as acrylic, polycarbonate or certain resins or combinations of these.

The association of these materials and their choice are generally dictated by parameters of the conditions of use because the panels thus provided must have structural characteristics suitable for the mechanical resistance necessary to resist:

impacts of different nature, birds, hail, stones, under conditions of use, variations of pressure, temperature, or specific phenomena such as abrasion.

The different panes generally have particular functions, separate from each other. There are provided inter-pane layers of adhesives between the different panes so as to connect them to each other to obtain a monolithic panel on the one hand and to obtain effects or to carry out particular actions on the other hand.

Such effects or actions consists in arranging antistatic and/or anti-reflective films, radiation filtration films, films to increase the mechanical resistance or again conductive films to ensure heating in the case of a defrosting function.

It is thus that in the field of aircraft for civil transport, or in the case of high-speed trains, the panels used, particularly the front glass forming the windshield of a cockpit, is made in a known and present fashion by a superposition of three panes of transparent material.

The external pane in contact with the atmosphere has characteristics of resistance to abrasion particularly to resist the blades of a windshield wiper or micro-impacts. This pane does not give mechanical resistance to the panel and is generally of low thickness.

The intermediate pane is a first pane that ensures mechanical resistance properly so-called by taking up all or a portion of the force generated by the conditions of flight in the case of an airplane for example.

The internal pane is a second pane which also ensures mechanical resistance properly so-called by absorbing all or a portion of the forces generated by the conditions of flight in the case of an airplane for example.

In the course of use, such panels can undergo degradation from impacts which give rise to forces greater than the mechanical resistance of the panes, or through accommodation of the effects of mechanical shock and/or thermal shock and/or electric shock. To this is added the weakening resulting from aging of the materials.

To give an idea of the order of magnitude, 5 to 10% of airplanes that fly are affected each year by the degradation of at least one pane of a panel.

In the case of airplanes, this is all the more critical than for other means of transportation because in the case of breakage of a pane, it is necessary that the pilot uses a procedure particular to this type of incident.

Essentially, this procedure consists in decreasing the altitude so that possible depressurization of the apparatus in flight will not be too abrupt.

This has the following immediate consequences:

an increase in fuel consumption because the motors are designed and adjusted to have the best output for a given cruising altitude, departure from the route to reach the nearest airport, immediate repair and/or the provision of a replacement airplane when possible, taking care of the passengers during repair.

This is particularly costly and time-consuming and the consequences to the company image and on profit are considerable.

However, numerous uses of such an emergency procedure could be avoided if the pilot could have an indication of the type of break in the panel. More precisely, it is fundamental that the pilot be able to know which is the panel, the outside, the middle or the interior, which has the break line.

Thus, if only the outside panel is affected, emergency measures are not necessary and the replacement of the panel can be carried out preferably in the course of regular maintenance or at least in a suitable place and with means permitting carrying out this replacement under optimum conditions.

If the intermediate or internal pane has break lines, alone or in addition to the external pane, the emergency procedure should be employed but this time with justification.

The same is true if the three panes are affected, the emergency panel could be all the more taken because the resistance becomes very precarious.

However, in nearly 95% of the cases, only the external panel is affected by the break, which is particularly prejudicial for operators but also for users for whom useless disagreements may arise.

The device according to the present invention has for its object to permit the pilot of the vehicle comprising a transparent panel constituted by at least two panes, more particularly the windshield of an aircraft cockpit, to determine visually whether upon the appearance of a break line in the panel, the latter affects one or several panels and which one or ones.

This device is integrated into the panel and its emplacement is carried out upon production of the panel. Because of this, it is possible to provide new vehicles but also different existing vehicles, with such panels. The production is almost not at all disrupted by the emplacement of this device and the costs are very small compared to what they otherwise would be.

To this end, the device for locating ruptures comprised by at least one break line, in a transparent panel comprising at least two panes, particularly the windshield of an aircraft cockpit, is characterized in that it comprises an opaque or semi-opaque obstacle disposed between two adjacent panes.

This obstacle is a strip disposed as a border of the usable region of the panel.

According to a first embodiment, there is provided an obstacle interposed between two panes.

According to another arrangement, there are provided two multi-pane regions and one obstacle interposed between these two regions.

According to still another arrangement, there are provided n panes and n−1 interposed obstacles, interposed one by one between two consecutive panes of which at least one is different.

More particularly, the obstacle is serigraphed onto one of the two facing surfaces of two adjacent panes.

So as to permit better reading, in the case of several obstacles, each obstacle is different from the preceding in shape and/or in dimensions and/or in color.

The invention also comprises the multi-pane transparent panel thus obtained, particularly for the production of an aircraft cockpit windshield.

The invention will now be described with regard to the accompanying drawings which show a particular embodiment, non-limiting, the different figures showing:

FIG. 1, a view through a panel with two panes according to the invention, from the interior, FIG. 2, a transverse cross-sectional view of the panel of FIG. 1, FIGS. 3A and 3B, the two cases of propagation of a break line in the interior and exterior panes, FIG. 4, a view through a panel with three panes according to the invention, from the interior, FIG. 5, a transverse cross-sectional view of the panel of FIG. 4, FIGS. 6A, 6B and 6C, the three cases of propagation of a break line in the interior, intermediate and exterior panes.

In FIG. 1, there is shown a panel 10 with two interior 12 and exterior 14 panes of transparent material, forming the windshield of the cockpit of an airplane to give a particularly sensitive example.

This panel is seen from the interior so that only the interior pane 12 is visible, the external pane appearing by partial breaking away of this figure.

The construction of such a panel is explained in FIG. 2, in which there are shown two panes but also the inter-pane layer 16, in this case a layer of adhesive which confers on the assembly a monolithic construction.

This adhesive is also transparent so as not to affect the optical qualities of the assembly.

The device for locating a rupture and break line 18 tracing this rupture comprises, as shown in FIGS. 1 and 2, an opaque visual obstacle 20 interposed between the two panes 12 and 14 and more precisely between the interior of the pane 12 and the inter-pane layer 16.

This obstacle is therefore permanently visible by the pilot, by transferencing through the internal pane. Because of this, it is desirable to arrange this obstacle so as to disturb as little as possible the field of vision through the panel forming the windshield, which is to say generally in the central region.

One embodiment consists in interposing a relatively narrow strip about all the periphery of the panel as a function of its shape. It will be noted that the strip should not approach too closely the edges, so as to avoid the phenomenon of delamination of the panes which would be triggered by the presence of an element forming an over-thickness.

It is moreover known that this arrangement is suitable for substantially all the cases, the break lines, even when they start in the central portion, having a natural tendency to propagate to at least one of the edges, particularly when the panel is loaded.

Thus, in FIG. 3A, there is shown the case of a rupture in the internal pane 12 which translates into a break line 22 which passes through the visual field and is prolonged by passing over the obstacle 20, and the break line is continuously visible, in superposition on the corresponding region of the obstacle.

In FIG. 3B, it is the external pane 14 which has a rupture which is represented by a break line 24. This break line is prolonged on opposite sides of the obstacle but it is interrupted in line with this obstacle. The break line being masked by the obstacle, it is seen to be in the external pane.

Thus the pilot, in case of an airplane in flight, can immediately estimate the gravity of the rupture by determination of the affected pane. Such a device is particularly reliable and cannot be erroneously interpreted. Moreover, this device cannot be affected by external parameters adapted to give false results.

In the case of the rupture of the obstacle carried by the internal pane upon a rupture of the external pane, the information can only reinforce safety because the pilot can be given to believe that the internal pane is broken whilst only the external pane is. There is thus the application of a procedure which is not necessary but which tends to limit risks.

It is also to be noted that the present device is valuable at night. With auxiliary illumination, always present in vehicles, particularly airplanes, it is also possible to proceed, from the interior, to conduct the visual analysis indicated above.

The material used for production of the obstacle is preferably opaque or at least semi-opaque and of a color which contrasts with possible tints given to the panel by other technical films as set forth above.

Preferably, the obstacle is obtained by serigraphy so as to provide a very strong adhesion of the obstacle on the surface which receives it. The pane thus serigraphed is then polymerized, in the case of the use of organic materials, which confers an excellent mechanical strength of the obstacle on the pane.

The device according to the present invention is also applicable to panels comprising more than two panes. In this case, there exist two options.

The first option consists in interposing a single obstacle between the external layer or layers without effect on the structural resistance and the internal layer or layers which ensure absorbing the stresses and which therefore require the pilot, in case of rupture, to take emergency procedures.

In this case, the pilot has a binary information, "danger", "without danger", with the impossibility of determining exactly the region of the rupture.

The second option consists in arranging obstacles different in form and/or color and/or design, between each pane.

This is the embodiments of FIGS. 4 and 5.

In the case of a panel with three panes, an internal pane 26, an intermediate pane 28 and an external pane 30, a first obstacle 32 is interposed between the internal pane 26 and the intermediate pane 28, on the surface of the internal pane, and a second obstacle 34 is interposed between the intermediate pane 28 and the external pane 30, on the surface of the intermediate plane.

The different layers 36 and 38 of inter-pane adhesive are disposed in a suitable manner.

The reading of the different figures shows:

FIG. 6A, the rupture of the intermediate pane 28 because the break line 36 passes behind the first obstacle 32 and in front of the second obstacle 34, the integrity of the panel is compromised and the emergency procedure must be used, FIG. 6B, the rupture of the external pane 30 because the first and second obstacles partially mask the break line 38, which is thus discontinuous at two places, the mechanical resistance of the panel is not affected and the emergency procedure need not be taken, and FIG. 6C, the rupture of the internal pane 26 because the break line 40 passes over the two obstacles 32 and 34, the integrity of the panel is compromised and it is necessary to take emergency procedures as in the case of FIG. 6A.

Such an arrangement thus permits imparting greater precision to the location of defects.

What is claimed is:

1. Aircraft windshield incorporating a device for locating a rupture comprising:

at least two aircraft windshield panes, and an opaque obstacle disposed between two adjacent panes of said at least two aircraft windshield panes.

2. Aircraft windshield according to claim 1, characterized in that the obstacle is a strip disposed bordering a useful region of the windshield.

3. Aircraft windshield according to claim 1, characterized in that there are no more than two said aircraft windshield panes with the obstacle interposed between the two aircraft windshield panes.

4. Aircraft windshield according to claim 1, characterized in that it comprises two regions of the at least two aircraft windshield panes and the obstacle is interposed between the two regions.

5. Aircraft windshield according to claim 1, characterized in that it comprises n said aircraft windshield panes and n−1 interposed said obstacles, wherein the obstacles are interposed one by one between two consecutive said aircraft windshield panes of which at least one is different, wherein n is at least 3.

6. Aircraft windshield according to claim 1, characterized in that the obstacle is serigraphed on one of two facing surfaces of two adjacent said aircraft windshield panes.

7. Aircraft windshield according to claim 1, comprising a plurality of said obstacles, each said obstacle being different from each other said obstacle in at least one of shape, dimensions, and color.

8. Aircraft windshield according to claim 1 in which said obstacle is spaced inwardly from all side edges of the windshield.

9. Aircraft windshield according to claim 1, in which there are three said panes and two said obstacles in the form of an outer strip disposed between an outermost said aircraft windshield pane and an intermediate said aircraft windshield pane and an inner strip disposed between said intermediate aircraft windshield pane and an innermost said aircraft windshield pane, a first of said strips bordering said windshield and a second of said strips being disposed within an area bounded by the first strip and spaced from the first strip.

10. The aircraft windshield of claim 1, wherein each said obstacle is opaque in its entirety.

11. The aircraft windshield of claim 10, wherein only an adhesive and the obstacle are disposed between said two adjacent aircraft windshield panes.

* * * * *